(12) United States Patent
Del Pino

(10) Patent No.: US 7,762,507 B2
(45) Date of Patent: Jul. 27, 2010

(54) HANGER FOR GYPSUM BOARD WALLS

(76) Inventor: Carlos Del Pino, Urb. Vista Mar, Cond. Costa Marina, Apartamento 4K, Carolina, PR (US) 00979

( * ) Notice: Subject to any disclaimer, the term of this patent is extended or adjusted under 35 U.S.C. 154(b) by 1007 days.

(21) Appl. No.: 11/180,248

(22) Filed: Jul. 13, 2005

(65) Prior Publication Data

US 2007/0011977 A1 Jan. 18, 2007

(51) Int. Cl.
*A47F 5/08* (2006.01)
(52) U.S. Cl. .............. 248/231.91; 248/216.1; 248/216.4; 248/497; 248/217.1; 248/217.3; 411/344
(58) Field of Classification Search ............ 248/231.91, 248/216.1, 216.4, 497, 217.1, 217.3; 411/344
See application file for complete search history.

(56) References Cited

U.S. PATENT DOCUMENTS

| | | | | |
|---|---|---|---|---|
| 478,313 A | * | 7/1892 | Davis | 411/342 |
| 730,055 A | * | 6/1903 | Smith | 248/497 |
| 1,445,372 A | * | 2/1923 | Wagner | 248/217.1 |
| 3,605,547 A | * | 9/1971 | Millet | 411/344 |
| 4,485,995 A | | 12/1984 | Hogg | |
| 4,509,713 A | | 4/1985 | Hogg | |
| 4,997,327 A | * | 3/1991 | Cira | 411/340 |
| 5,991,998 A | | 11/1999 | Kaneko | |
| 6,036,149 A | | 3/2000 | Del Pino et al. | |
| 6,273,380 B1 | * | 8/2001 | Fillipp et al. | 248/231.91 |
| 6,318,941 B1 | * | 11/2001 | Guenther | 411/342 |
| 6,662,522 B2 | | 12/2003 | Nichols et al. | |
| 6,830,228 B2 | * | 12/2004 | Ernst | 248/475.1 |
| 7,207,535 B1 | * | 4/2007 | Giuliani | 248/216.1 |

* cited by examiner

*Primary Examiner*—J. Allen Shriver, II
*Assistant Examiner*—Michael McDuffie

(57) ABSTRACT

The instant invention relates to a novel powerful wall hanger for supporting different objects. Particularly, the invention concerns a hanger that is used in gypsum board and similar walls and that's provides a stable and safe holder of variable weights.

11 Claims, 3 Drawing Sheets

HANGER FOR GYPSUM BOARD WALLS

BACKGROUND OF THE INVENTION

This invention relates to a wall hanger for supporting different objects. Particularly, the invention concerns a hanger that is used in gypsum board and similar walls and that provides a stable and safe holder for objects of variable weights.

DISCUSSION OF THE INVENTION

The industry of construction has always moved toward the use of low-cost materials that can at the same time present high quality characteristics. Gypsum is one of the materials that fulfills those requirements. It is known that about 90% of the interior surfaces of buildings are covered with gypsum products. Notwithstanding its low costs and high quality characteristics, gypsum products have limited structural strength. This limits the kind of objects that can be hung on gypsum structures. Moreover, the structural composition of gypsum board walls' facilitates the rupture of the walls when fasteners like screws are inserted on it. This happens because this kind of fasteners penetrate just a few inches from the wall's surface exerting, when an object is hung, all the force in a reduced area near the said surface. The result of this situation is that the weight of the hung object pulls out the fastener, causing damages to the gypsum wall structure. Other types of fasteners like those fixed to the walls with adhesive tabs, do not resolve the problem. Those fasteners do not improve the weight capacity of the wall and have the same problems that conventional fasteners have. In this case, the damage would not be a hole in the gypsum board wall like when using screws but it will be tear-outs of the wall's surface. Both types of damages affect the esthetical element of the gypsum, which, along with its low cost and high quality, makes it so attractive to contractors, architects and designers.

Many of the hangers previously disclosed also comprises complicated parts and can only be used in walls of a determinate thickness. See for instance Hogg, U.S. Pat. Nos. 4,485,995 and 4,509,713 and Del Pino et al, U.S. Pat. No. 6,036,149, wherein all of the cited patents described a series of complex hangers requiring difficult installation procedures. Therefore, it can be appreciated that there exists a prevalent need for new and improved hanger to be installed on gypsum board and similar walls that can permit to hang heavy objects. In this regard, the present invention substantially fulfills this need. The present invention overcomes the inability of the prior art to foresee the relative structural weakness of the gypsum board walls that limits the possibility of hanging heavy objects. Furthermore, the invention is designed to fix to a gypsum board walls by going through it and anchoring on the backside of the gypsum board panel. In this way, the weight of heavy objects is best distributed along the entire gypsum board panel, giving more resistance to the wall and to the device and, in consequence, allowing heavy objects to be hung. This hanger helps to diminish potential damages that gypsum board walls may suffer by increasing the surface area that absorbs the perpendicular force that heavy objects may exert on the steel handle. Furthermore, the disclosed device is unique by the simplicity of its elements and by the fast and easy installation process.

None of the prior art considered above, taken either simply or in combination teaches the use of a hanger as described herein that by anchoring to the gypsum board walls backside permits users to hang heavy objects and that only requires fastening a single hole. In light of the foregoing, it will be appreciated that what is needed in the art is a steel hanger that could give the opportunity of hanging heavy objects on gypsum board or similar walls while overcoming the physical disadvantages of the fragility of the said walls.

SUMMARY OF THE INVENTION

The object of the present invention is to provide a hanger that could be used to hang heavy objects on gypsum board or similar walls.

It is still a further object of the present invention to provide a hanger comprising a flat hard backing plate with an opening in its center that is a receiver of a fastening and having two elongated, stripes located at the front part of the plate and wherein the said two stripes are in parallel positions to the sides of the opening plate so as to permit to attach the hanger to gypsum board or similar walls of different width. The said hanger can be made of different materials that can allow the functioning of each part of the hanger and its particular size depends on the width of the wall wherein the said hanger will be installed. Preferably the backing plate is made of galvanized steel while the fastening is made preferably of steel.

It is the object of the present invention to provide a hanger comprising of a very simple structure that is very easy to be installed on gypsum board or similar walls.

Another object of this invention is to provide a hanger that can be installed on gypsum board or similar walls, even after the walls have been assembled, without using any complex installation tools.

Another object of the present invention is to provide a hanger made of steel, which provides the device with better resistance to absorb the force exerted by heavy objects, avoiding the breakage of the handle and damages to the gypsum board or similar walls.

It is a further object of the present invention to provide a hanger that can be installed in gypsum board or similar walls in such a way that the weight of the hung object is distributed over a greater surface area than the one involved when screws or other complicated hangers are used to hang objects from gypsum board walls. Surprisingly, the instant hanger described herein and its obvious variations permit that objects weighing as much as 150 pounds can be hung on this type of walls.

The present invention itself, both as to its configuration and its mode of operation will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more the one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other. Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE PREFERRED EMBODIMENT

Turning to the diagrams, the device of the present invention comprises a steel hanger to be installed on gypsum board or similar panels. The preferred embodiment comprises of a hanger comprising a metal plate or backing plate that has two metal sheets or stripes attached to it.

Figure 1:
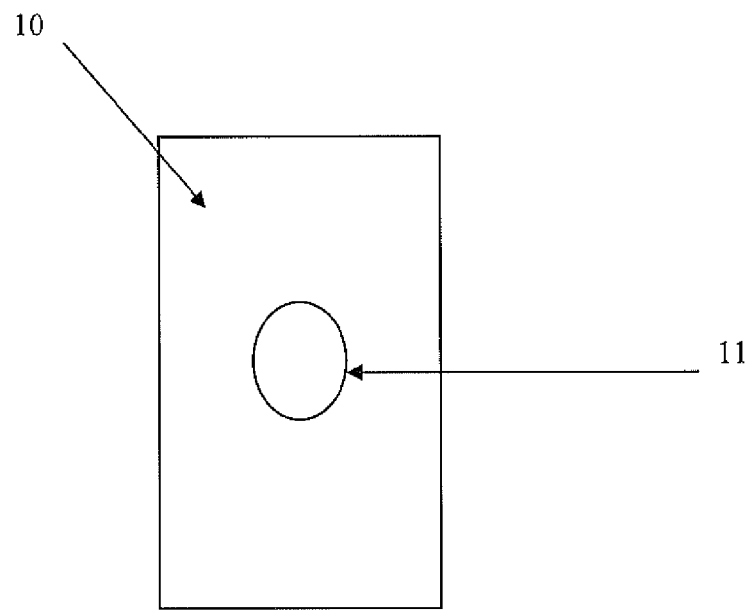
FIG. 1 shows a front view of the back side of the backing plate.

FIG. 1 shows the front view of the back side of the backing plate 10 that has in its center a hanger opening 11.

Figure 2:
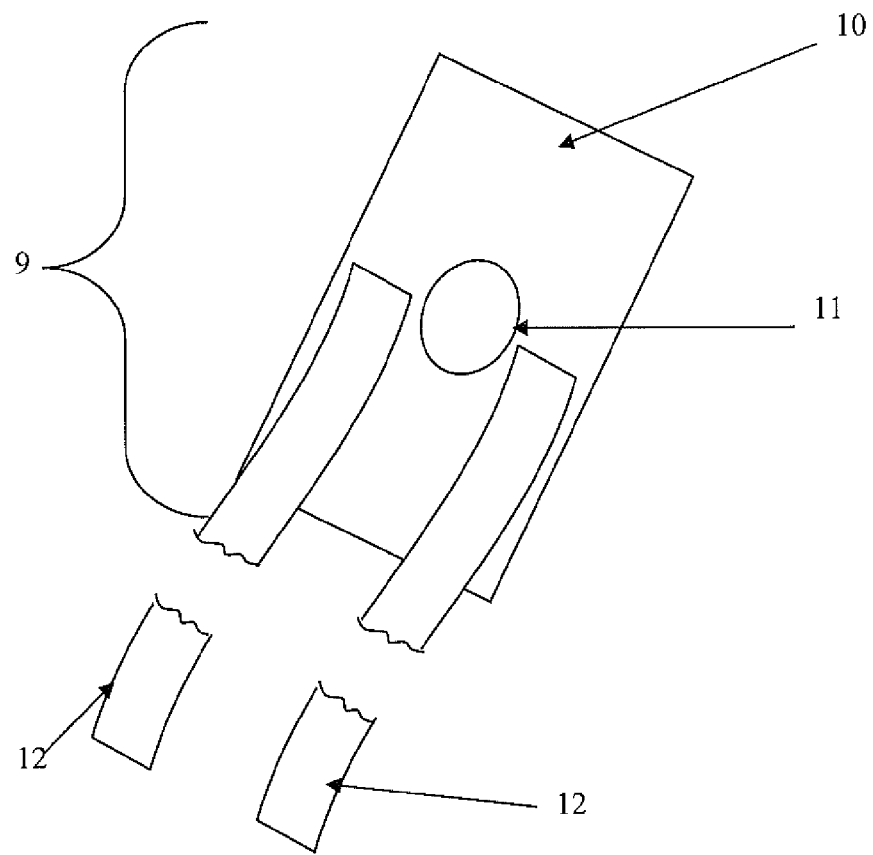
FIG. 2 shows an inclined cross view of the front part of the hanger.

FIG. 2 shows a cross view of the preferred embodiment where it can be appreciated how metal stripes 12 are attached to the backing plate. The stripes 12 are not connected to each other and are only connected to the plate 10 in hanger 9. Considering as a point of reference the plate opening 11, they are attached to each one of the sides of the said opening 11 in a parallel manner so as to define along with the plate a straight or substantially straight line having in its center the hanger opening 11. Thus the said stripes 12 are in the order 12-11-12 with regard to the centered plate opening 11.

Metal stripes 12 have a maximum rotation angle of 180° in relation to the metal plate 10 position. The said stripes are not interconnected, thus each sheet has its own rotation. This means that each metal stripe 12 can be rotated to a different degree without affecting the positioning of the other metal stripe 12.

Figure 3A:
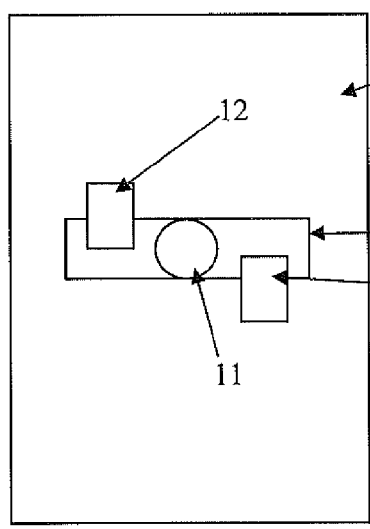
FIGS. 3A-3C shows a front view of the wall after the hanger has been assembled but before it has been fastened.
Figure 3B:
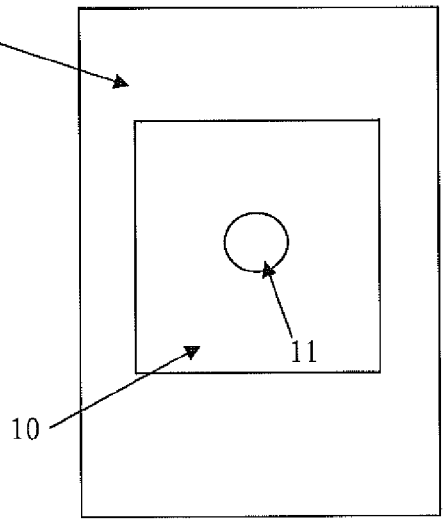
Figure 3C:
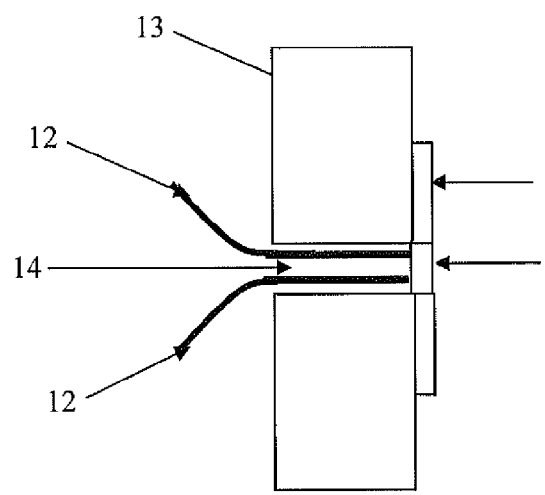

FIGS. 3A-3C shows views of the assembled hanger 9 on the wall 13 that has not been yet fastened front different positions: front, cross and back views.

FIG. 3A represents a front view of the wall 13 having the hanger 9 assembled. Notice that the extremes or final part of the stripes 12 have been bent against the surface of the wall 13 and in opposite yet parallel directions leaving the said wall compressed between the bended stripes 12 and the backing plate 10.

FIG. 3B shows the back view of the wall 13 already assembled with the hanger 9. Notice that the plate 10 is held tightly to the wall 13 and that the said plate is pulled toward and sustained by the stripes 12.

FIG. 3C shows a cross section of the wall 13 assembled to hanger 9 but not already fastened. Notice that the hanger opening 11 on the plate 10 is aligned to the space between the bent stripes 12, so as to an alignment is defined between the space between the stripes 12, the wall opening 14 and the plate opening 11 in such a way that if a fastener, for instance a screw is engaged in the said direction it will effectively compress the wall between the hanger.

FIGS. 4A-4F show a process to install the hanger 9 on wall 13. Initially, the hanger 9 is inserted in a previously made wall opening 14 that goes from the front side to the backside of the wall 13. In order to facilitates the insertion, the stripes 12 can be rotated so as to together with hanger plate 10, the whole hanger 9 looks similar to an arrow that can by push through the wall opening easily by allowing the plate 10 to be the first element of the handle to go through the wall opening 14. In another words the stripes 12 are aligned to a 0° angle from the metal plate 10 and then the said metal plate is inserted in the wall opening.

Subsequently, once the metal plate 10 is completely inserted through wall 13 as shown in FIG. 3C the steel plate 10 is going to be aligned parallel to the wall 13 by pulling the stripes 12 toward the user. The user shall pull toward him or her, the stripes 12 until the metal plate 10 gets tightly press against the backside of the wall 13.

When the plate 10 is tensed to the back of the surface of the wall 13 the length of the metal stripes 12 are cut off as is showed in FIG. 3B. The size of the extremes of the said stripes is decided base upon the width of the wall. Then, as demonstrated on FIG. 4d, the extremes of the stripes 12 are going to be bent against the front side of the wall 13 keeping the metal plate 10 is in tight contact against the backside of the wall 13. Notice that the wall opening 14 as well as to the space between the stripes 12 are aligned or substantially aligned in such a way that a fastening means, for instance a screw, can be inserted via the said aligned pass to compress the wall 10 and allow the hanging of the object.

Indeed, in the last part of the process, a heavy object or a base to which it will be positioned can be fastened to the hanger by rotating a screw or similar fastener 15 through the space between the stripes 12 via the wall opening 14 and through the plate opening 11.

Important factors in determining the size of the hanger are the size of the object to be hung as well as the thick of the wall wherein the object would be hung. The said hanger can be installed in different directions relative o he angle formed between the wall and ground floor. Surprisingly, this device permits to hang objects weighing as much as 150 pounds.

Figure 4A:
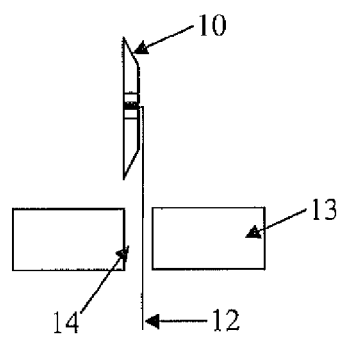
FIGS. 4A-4E shows steps to install the steel hanger on gypsum board walls.
Figure 4B:
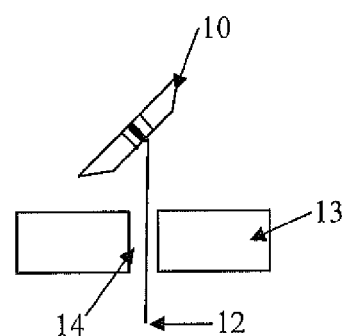
Figure 4C:
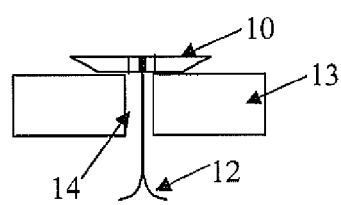
Figure 4D:
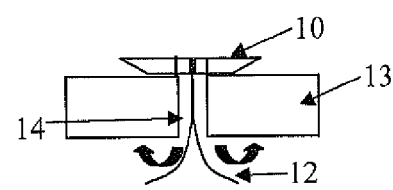
Figure 4E:
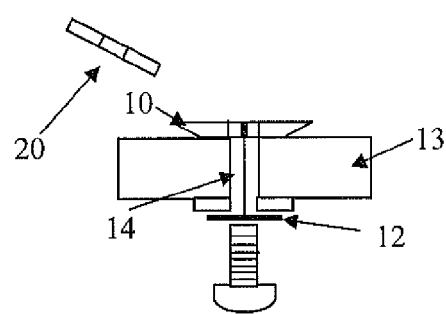
Figure 4F:
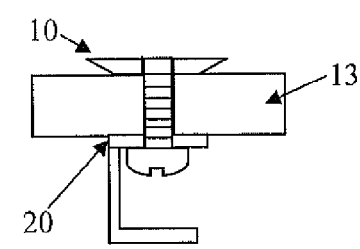

Alternatively and among other possible variations of the process, the said stripes 12 as shown in FIG. 4C can be inserted through a previous opening on the surface of the object to be hung, such as object 20 and then the said stripes 12 can be bent against the surface of the said object, followed by fastening through the surface of the object being hung, see for instance FIG. 4F.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof.

The details in the patents, patent applications, and publications incorporated by reference herein may be considered to be incorporable at applicant's option, into the claims during prosecution as further limitations in the claims to patentable distinguish any amended claims from any applied prior art.

I claim:

1. A hanger to be mounted to a wall, wherein the said wall can have a non-determined thickness, said hanger comprising:
   a) a backing plate to be slid through a previously made slot in a wall wherein said backing plate comprises
   an elongated body comprising a front surface and a back surface,
   wherein said front surface comprises a substantially flat and hard surface without protrusions, a first front surface distal end and a second front surface distal end,
   wherein said back surface comprises a substantially flat and hard surface, a first back surface distal end and a second back surface distal end; and a perforation, wherein said perforation is located substantially in the center of said backing plate,
   wherein said back surface area is bigger than the front surface area,
   wherein said first front surface distal end is connected to said first back surface distal end by a first tapered portion, wherein said second front surface distal end is connected to said second back surface distal end by a second tapered portion, wherein said first tapered portion and said second tapered portion opposed each other and are located between said back surface distal ends and front surface distal ends,
   b) a first non-interconnected strip and a second non-interconnected strip, wherein said first non-interconnected strip and said second non-interconnected strip are connected to said front surface,
   wherein said first non-interconnected strip and said second non-interconnected strip rotates without contacting each other, extends perpendicular to the perforation perimeter and are substantially aligned in a parallel manner so as to define a substantially straight line having said perforation center between said first non-interconnected strip and said second non-interconnected strip,
   wherein said first non-interconnected strip and said second non-interconnected strip are arranged to be extended perpendicularly to said backing plate and parallel to the outside of the previously made slot opening without contacting the previously made slot inner walls, and
   c) means for compressing said backing plate to said wall.

2. The hanger of claim 1, wherein the means for compressing comprises a screw.

3. The hanger of claim 1, wherein the height, length and thickness of the backing plate and the two stripes depend on the thickness of the wall wherein the hanger is assembled and/or the weight of the object to be hang.

4. The hanger of claim 1 wherein the plate, the stripes and the means for compressing are made of metal.

5. The hanger of claim 4, wherein the plate and the stripes are made of steel.

6. The hanger of claim 5, wherein the steel is galvanized steel.

7. The hanger of claim 1, wherein the two stripes have a maximum rotation angle of 180 degrees in relation to the backing plate so as to allow the said first non-interconnected strip and said second non-interconnected strip to bend in a direction so as to the backing plate can be inserted through a previously made slot in the wall up to the complete plate is on the opposite side of the wall, and at the same time as the stripes rotate, the plate is pulled toward the wall by pulling said first non-interconnected strip and said second non-interconnected strip so as to the front surface is substantially contacting the wall and its ending extremes are bent in opposite directions parallel to the wall in the front part of the said wall so as to the wall is kept tightly press between the bent extremes of the stripes and the backing plate; and wherein subsequently, said means for compressing is inserted through the space between the bent said first non-interconnected strip and said second non-interconnected strip in the wall opening and through the plate perforation and subsequently the stripes are cut off.

8. The hanger of claim 7, wherein the compressing means comprises a screw.

9. The hanger of claim 1, wherein said first non-interconnected strip and said second non-interconnected strip are bent in a direction in such way that the backing plate can be inserted through said previously made slot in the wall, and subsequently, after said backing plate has been passed through the slot, it can be pulled toward the back surface of the wall by pulling the first non-interconnected strip and said second non-interconnected strip so as the front surface is substantially contacting the wall and wherein the first non-interconnected strip and said second non-interconnected strip are optionally passed through a second slot previously made on an object having a object surface to be hang, wherein the ending extremes of said first non-interconnected strip and said second non-interconnected strip are bent in opposite directions on the object surface so as to a mean for compressing is inserted through the said second slot and aligned to the perforation of the backing plate in order to compress the wall and the object between the backing plate and the extremes of said first non-interconnected strip and said second non-interconnected strip.

10. The hanger of claim 9, wherein the mean for compressing comprises a screw.

11. A backing plate to be slid through a previously made slot in a wall comprising a substantially flat and hard front surface without protrusions,
   a substantially flat and hard back surface,
   and a perforation located substantially in the center of the said plate,
   wherein said back surface area is bigger than the front surface area and at least two tapered portions opposed to each other are located between said back and front surface,
   a first non-interconnected strip and a second non-interconnected strip connected to the front surface, wherein said first non-interconnected strip and said second non-interconnected strip extends perpendicular to the perforation perimeter and are substantially aligned to the perforation center in a parallel manner so as to define a substantially straight line, wherein said stripes arranged to be extended perpendicularly to said backing plate and parallel to the outside of the previously made slot opening without contacting the previously made slot inner walls,
   wherein said first non-interconnected strip and said second non-interconnected strip have a maximum rotation angle of 180 degrees in relation to the backing plate so as to allow each stripe to bend in a direction parallel to the backing plate without affecting the position of the other strip, and a fastening mean inserted through the space between said first non-interconnected strip and said second non-interconnected strip and through the plate perforation to compress the backing plate to the wall.

* * * * *